United States Patent
Simon et al.

(10) Patent No.: US 7,224,262 B2
(45) Date of Patent: May 29, 2007

(54) WIRELESS VEHICLE CONTROL SYSTEM AND METHOD

(75) Inventors: Gregory Simon, San Francisco, CA (US); Helmut Wagatha, Oberschleissheim (DE); Maximilian Fuchs, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 110 days.

(21) Appl. No.: 10/945,423

(22) Filed: Sep. 21, 2004

(65) Prior Publication Data
US 2006/0061458 A1 Mar. 23, 2006

(51) Int. Cl.
*B60R 25/10* (2006.01)

(52) U.S. Cl. .......................... 340/426.13; 340/426.14; 340/426.35; 340/426.36

(58) Field of Classification Search ........... 340/426.13, 340/426.14, 426.15, 426.16, 426.17, 426.36, 340/439, 539.11, 539.19; 701/29, 33; 345/173; 455/571, 419, 423
See application file for complete search history.

(56) References Cited

U.S. PATENT DOCUMENTS

| | | | | |
|---|---|---|---|---|
| 5,812,953 A | * | 9/1998 | Griffith et al. | 455/558 |
| 5,859,628 A | * | 1/1999 | Ross et al. | 345/173 |
| 5,884,202 A | * | 3/1999 | Arjomand | 701/29 |
| 5,887,269 A | * | 3/1999 | Brunts et al. | 701/208 |
| 6,134,453 A | * | 10/2000 | Sainton et al. | 455/553.1 |
| 6,650,224 B1 | * | 11/2003 | Weigl et al. | 340/5.61 |
| 6,816,760 B1 | * | 11/2004 | Namaky | 701/29 |
| 6,819,916 B1 | * | 11/2004 | Griffith et al. | 455/410 |
| 6,934,558 B1 | * | 8/2005 | Sainton et al. | 455/552.1 |
| 7,027,808 B2 | * | 4/2006 | Wesby | 455/419 |

\* cited by examiner

*Primary Examiner*—Van T. Trieu
(74) *Attorney, Agent, or Firm*—Crowell & Moring LLP

(57) ABSTRACT

A system and method is provided for wireless remote control of the operation of vehicle components such as a door lock or an entertainment system. An electronic host device, such as a PDA or a mobile telephone, is coupled to a vehicle-specific transponder, and a user interface program executed on the host device allows a user to select a desired vehicle component operating command for execution. The selected operating command is sent to the transponder for transmission to the vehicle, and a vehicle receiver forwards the selected command to the target component for execution. The transponder may contain vehicle-specific authorization information which the vehicle receiver may use to verify authorization to operate the vehicle. Additionally, information stored on the host device such as telephone numbers and addresses may be transferred via the transponder to vehicle components which may use such information for task such as navigation of initiating telephone calls.

32 Claims, 2 Drawing Sheets

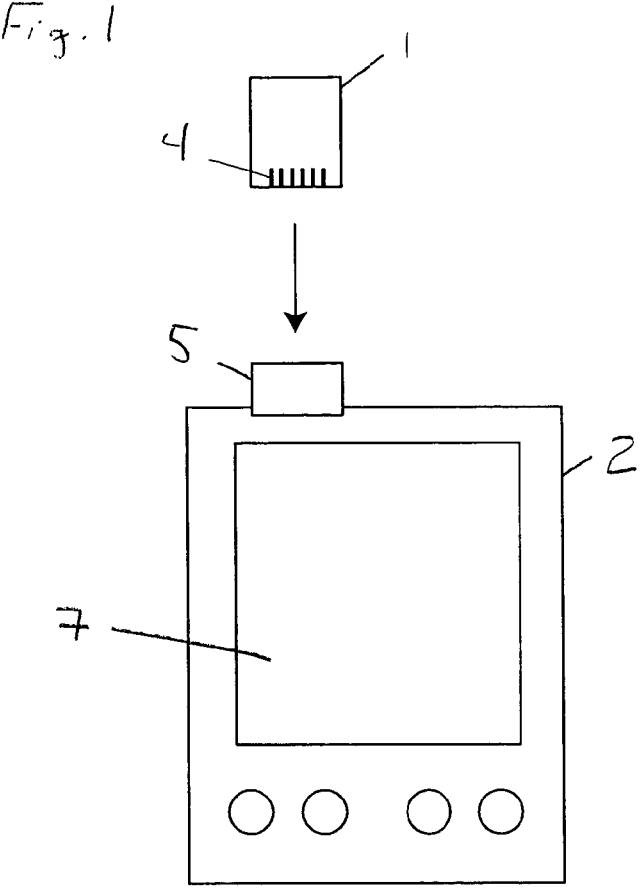
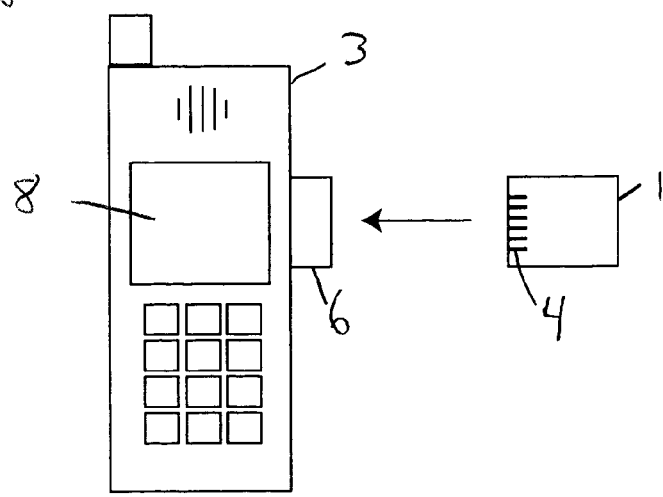

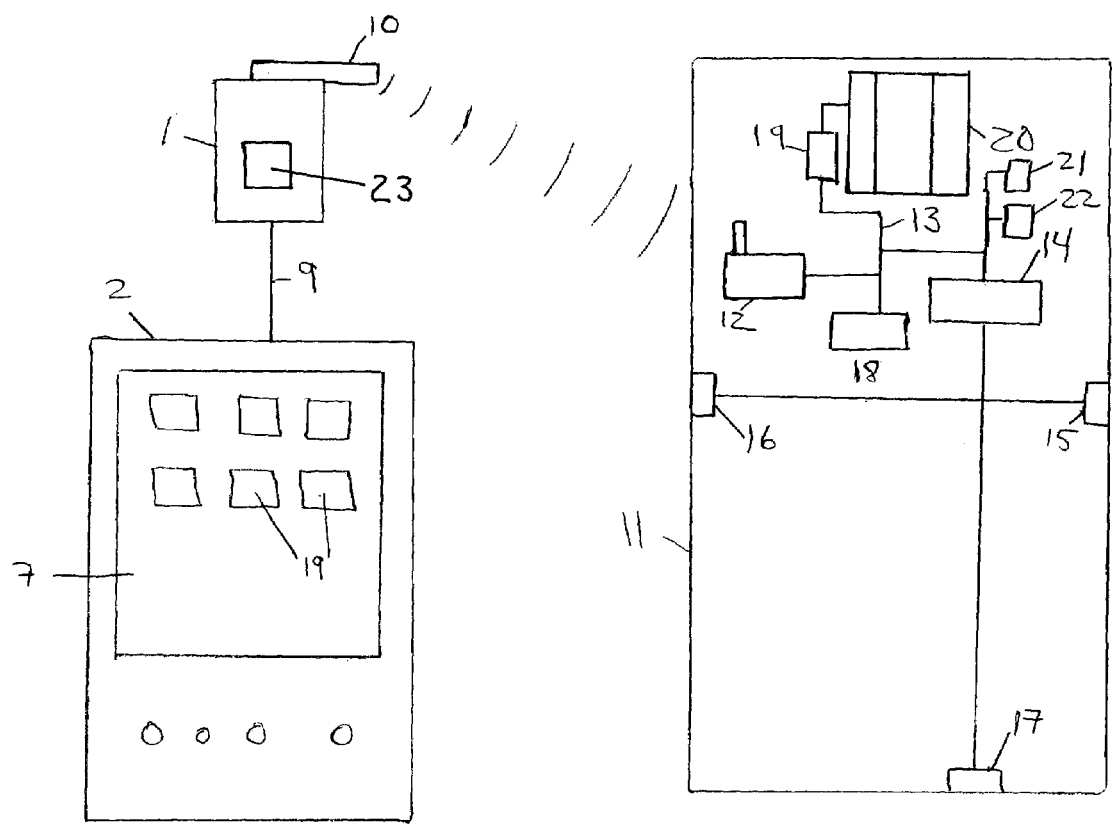

WIRELESS VEHICLE CONTROL SYSTEM AND METHOD

BACKGROUND OF THE INVENTION

The present invention relates to an apparatus and a method for remote wireless control of components of a vehicle using a combination of a programmable electronic host device with a vehicle-specific transponder.

New vehicles are typically delivered to customers with a number of physical (metal) keys and, with well-equipped vehicles, one or more wireless remote control units for operating vehicle features such as door locks. These wireless units usually employ either RF (radio frequency) or infrared transmissions to send signals to a vehicle receiver unit.

A problem with these known remote control units is their limited functionality. For example, many remote control units only permit operation of vehicle locks and actuation of alarm systems. Further, the functionality of these units is typically fixed, with no provision for altering the vehicle function to be controlled when a particular remote unit button is actuated.

In contrast to the lack of programmability of most remote control units, programmable hand-held electronic devices have become very popular with consumers. This is due in part to the inherent flexibility of these devices, where new functionality may be added merely by downloading and executing new programs on the devices, in part to the large amount of information that can be stored therein and rapidly accessed by a user, and in part to the intuitive nature of user interfaces which often permit user interaction by pointing at objects displayed on a touch-sensitive screen.

Many different types of programmable electronic devices exist, including programmable personal digital assistants ("PDAs"), which can accept and execute a program, programmable cellular telephones, and portable computers. Hand-held electronic devices recently have been further enhanced by the development of removable cartridges containing wireless transmitters and receivers. These cartridges allow the device operator to communicate with other hand-held devices or, for example, to receive and/or send information over networks such as the Internet.

SUMMARY OF THE INVENTION

It is an objective of the present invention to combine the inherent flexibility of programmable hand-held electronic devices with the remote vehicle control capabilities of wireless vehicle remote control units to provide an intuitively-operable, highly flexible remote vehicle component operating device and method.

This objective is accomplished by providing a vehicle with an internal communications network to which a plurality of vehicle components are linked, a vehicle receiver communicating with the internal network, a vehicle-specific transponder with a wireless transmitter, and a host device to which the transponder is connected, where the host device may be programmed to present a user with a menu of vehicle component operating commands, and where the host device sends a vehicle component operating command selected by a user to the transponder for transmission to the vehicle receiver, which in turn forwards the selected command to a target vehicle component for execution.

In one embodiment of the present invention, an industry-standard peripheral cartridge (such as a so-called "CF" ("Compact Flash") card, an "SD" ("Smart Digital") card, or a Sony Memory Stick™) equipped with a wireless RF transmitter connected to a host device such as a PDA executing, for example, the the Microsoft Windows Pocket PC® operating system. Upon connection of the transmitter-equipped cartridge (also referred to herein as a "transponder") to the PDA by insertion of the transponder into a corresponding industry-standard port, a Pocket PC®-compatible vehicle interface program is executed on the PDA.

In a preferred embodiment, the program presents intuitive graphical user interface ("GUI") symbols, e.g., "buttons" which are "selectable" on a touch-sensitive screen, which allow the PDA user to select a vehicle component to operate (such as door locks, climate control system, engine starter, or entertainment system). Once selected, a corresponding operating command may be sent from the PDA through the wireless transmitter to the vehicle. Alternatively, selection of a component button on the user interface may take the user to a sub-menu of operating commands for specific features of the selected vehicle component that may be presented (e.g., ventilation system temperature or blower fan speed controls). A receiver in the vehicle then passes the operating command received from the transponder's transmitter through the vehicle's internal network to the target vehicle component for execution.

Another objective of the present invention is to provide the transponder with vehicle authentication information, such as an encrypted code specific to a particular vehicle, which the vehicle receiver uses to verify that the transponder is authorized to command operation of the vehicle's components.

A further objective of the present invention is to provide a copy of the vehicle interface program in a memory of the transponder, and to provide for the transfer of the program to the host hand-held electronic device for execution when the transponder is connected to the device. This feature greatly simplifies the user experience by eliminating the need for the user to separately download and install the vehicle interface program each time the transponder is connected with a new host device.

An additional objective is to permit the vehicle user interface program to be reconfigured to allow presentation of alternative vehicle components for selection by the user, for example, as a user's preferred grouping of vehicle components on the interface screen. This reconfiguration could be accomplished by user set-up within the program, or by re-programming of the host device.

A further objective is to provide for host device-facilitated configuration and/or storage of user vehicle preferences, such as memory seat positions, climate and entertainment control settings, and to allow transfer of a user's set of preferences between multiple transponders by sequential connection and information transfer. A related feature is the ability to host multiple user preference sets on the same host device to facilitate multi-party use of the vehicle.

Another objective of the present invention is to allow data from the host device, such as telephone numbers and address information contained in a PDA's "contacts" database, to be extracted from the host device and provided through the transponder to the vehicle, and then routed for display and/or use by the appropriate vehicle component, such as a cellular telephone or a Global Positioning System ("GPS")-based navigation system. This feature thus simplifies the complex task of operating the vehicle by eliminating any need for the user to enter data on a character-by-character basis into the vehicle component before the component may be used, for example, to locate and provide routing instructions to reach a desired address.

The present invention thus provides a highly flexible approach to providing a user with the ability to operate a virtually unlimited number of vehicle components from a common, intuitive user interface on any compatible hand-held electronic device to which the user's vehicle control transponder is connected.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration of the connection of a transponder to a PDA host device in accordance with an illustrative embodiment of the present invention.

FIG. 2 is a schematic illustration of the connection of a transponder to a cellular telephone host device in accordance with an illustrative embodiment of the present invention.

FIG. 3 is a schematic illustration of an embodiment of the present invention for controlling operation of vehicle components via a transponder and host device in accordance with an embodiment of the present invention.

DETAILED DESCRIPTION OF THE DRAWINGS

FIGS. 1 and 2 provide exemplary illustrations of the connection of an SD-format transponder card 1 into alternative hand-held electronic host devices, the example here including PDA 2 and cellular telephone 3. Connection of transponder 1 to either host device 2 or 3 is via electrical contacts 4, which contact corresponding electrical contacts (not illustrated) within industry-standard SD ports 5, 6 built into devices 2, 3. The connection of transponder 1 to a host device is not limited to "plug-in sockets," and may be by any approach which provides the desired communications between the transponder and the host device, such as by a linking cable, a wireless transmission, etc.

Upon insertion of transponder 1 into the host device, programming in transponder 1 determines whether a vehicle interface program (also referred to as a vehicle operating command selection program) is located on the host device. If the program is not present on the host device, a copy of the program is transferred from a memory 23 in transponder 1 (not illustrated) to the host device for execution. Otherwise, the command selection program is automatically executed upon insertion of the transponder card. As a result, at the host device user interface (displays 7, 8 in FIGS. 1 and 2), the user is presented with a listing of available vehicle operating commands in, for example, text format or as icons in a GUI. The user may then select a desired vehicle component operation (such as unlocking a vehicle door, starting the engine, adjusting the volume of the vehicle's radio, starting and setting a desired temperature to be maintained by the vehicle's climate control system, etc.). Further discussion of the operation of this embodiment is presented in connection with FIG. 3. It is noted that the command selection user interface is not limited to touch-screen input, but may also include other interface features, such as buttons or typing keys on the host device.

FIG. 3 is a schematic illustration of an embodiment of the present invention employing the transponder 1 and PDA host device 2 of FIG. 1. Transponder 1 is in communication with PDA 2 via link 9. Transponder 1 is equipped with a wireless transmitter 10, which transmits a wireless signal to vehicle 11. The electrical energy needed by transmitter 10 may be supplied by PDA 2, or from an on-board battery (such as a back-up battery provided to maintain information stored in the transponder memory). Transponder 1 also is provided with vehicle authentication information associated with vehicle 11, which is used by vehicle 11 to verify that commands received from transponder 1 may be accepted and executed by the vehicle components.

Vehicle 11 is provided with a vehicle receiver 12 for receiving wireless signals emitted by transmitter 10. Receiver 12 may also be provided with a transmitter and transponder 1 with a receiver, to permit two-way communication between the vehicle 11 and transponder 1. Further, information and/or commands passed between transponder 1 and receiver 12 may be encrypted, in order to minimize the potential for unauthorized capture and use of the vehicle authentication information.

Receiver 12 is connected to a vehicle internal communications network 13. In this embodiment, network 13 is a digital communications network over which information and commands may be passed between vehicle components on shared links. Also connected to the vehicle network 13 are several vehicle components, including a lock control module 14 which controls the operation of door lock actuators 15, 16 and trunk lid actuator 17, ventilation system 18, engine control module 19 which controls the starting and operation of engine 20, mobile communications device (e.g., cellular telephone) 21, and navigation system 22. Of course, any type and number of vehicle units may be coupled to the vehicle network.

In operation, a user connects transponder 1 to PDA 2, in this embodiment, by inserting SD card-format transponder 1 into a corresponding SD card port in PDA 2. On insertion, a vehicle operating command selection program is transferred from the transponder 1 memory to PDA 2 and executed thereon. When executed, the program causes PDA touch-screen display 7 to present the user with a number of vehicle command selections, preferably in the form of icons 19 using the PDA's graphical user interface. The user may also select and store user preferences for vehicle set-up, such as power seat and mirror positions, ventilation settings and entertainment system settings. The preferences are stored in this embodiment in the memory of transponder 1, however, they may alternatively be stored in PDA 2. More than one set of user preferences may be maintained and selected on PDA 2, thereby permitting multiple users to control the vehicle with a single transponder 1.

Once the user has selected a vehicle operating command at the PDA 2 user interface (in this case, by touching a stylus or other object, such as a finger, to the touch screen 7), the selected command, for example a vehicle door unlock command, is sent to the transponder 1 for transmission to the vehicle 11. The selected command is then transmitted, along with the vehicle authentication information residing in transponder 1, in encrypted form from wireless transmitter 10 to vehicle 11. The transmitted information is received by receiver 12, and the decrypted vehicle authentication information is checked to verify transponder 1 is authorized to issue commands to vehicle 11. The verification process may be performed at receiver 12, or by a downstream security verification module. The verification process may also include one or more two-way exchanges of information between transponder 1 and vehicle 11. Such verification processes are well known in the art, and thus are not described in any greater detail here.

In addition to transmitting the selected command and the vehicle authentication information, transponder 1 may also cause transmitter 10 to forward the user's vehicle preferences to receiver 12 along with the selected command.

Upon verification of transponder 1's authorization to operate components of vehicle 11, the transmitted vehicle component operating command to operate the vehicle's door lock actuators 15, 16 is transmitted over the vehicle internal communications network 13 to lock control module 14. Because the network 13 uses a component address protocol which uniquely identifies the vehicle components in communication with the network, the selected operating command (in this case, "locks open") must be placed into a format which will result in the target component (in this case module 14) receiving the command. The selected operating command therefore may be transmitted from transponder 1 already formatted in accordance with the vehicle network protocol, or may be placed into the necessary format once received by vehicle 11.

In response to receiving the selected operating command, lock control module 14 executes the command by applying the appropriate voltage signal to the "unlock" circuits of door lock actuators 15, 16, thereby unlocking the vehicle doors.

In parallel with providing the selected operating command to the target vehicle component, the user's preferences for features such as seat and mirror position, ventilation, etc. may also be transmitted to the appropriate control module(s) to adjust these systems in accordance with the user's preferences prior to the user entering the vehicle.

The present invention is not limited to operation of door lock actuators, but instead may command operation of other vehicle components. As examples, a user may select on PDA 2 an icon corresponding to opening of trunk lid 17, whereby the selected operating command would be forwarded via transponder 1, wireless transmitter 10 and receiver 12 to module 14, which would cause a voltage signal to be applied to trunk actuator 17. Alternatively, selection of a remote starting command on PDA 2 would result in transmitter 10 forwarding an engine start command to engine control module 19 to start engine 20. In response to a typical user's desire to be able to remotely start a vehicle from a significant distance (e.g., from within the user's home on a cold winter morning), the command selection program may direct the transponder 1 to have transmitter 10 operate at a higher power level than normally used for other vehicle operating commands. Commands may also be selected at PDA 2 to, for example, operate ventilation system 18 to remotely control the vehicle interior environment.

In another embodiment of the present invention, there is provided the capability to transfer user preferences between multiple transponders. In this embodiment, the vehicle component operating command program is written such that a first transponder may be connected to the host device and the user's preferences then transferred from the memory of the first transponder to the host device. The first transponder is then disconnected from the host device and replaced by a second transponder, whereupon the selection program executing on the host device may be used to transfer the user's preferences to the second transponder.

In order to facilitate multi-party use of the vehicle, another embodiment provides the ability to host multiple user preference sets in either a transponder or a host device. As with the previous embodiment, user preference sets may be transferred to the desired storage location (transponder and/or host device) by sequential connection of transponders to a host device. When subsequently used to send operating commands to the components of a vehicle, the host device operator would be able to select the user preference set to be sent to the vehicle with the selected operating command(s).

In a further embodiment, the link between the transponder and the vehicle may be used to extract and transfer information stored on the host device to the vehicle. The vehicle operating command selection program may be provided with a selection option which, for example, allows a user to select a contact entry from a contact database stored in the PDA 2 and command this information be forwarded to the vehicle's mobile communications device 21. The contact information would then be forwarded to transponder 1 for transmission to receiver 12, which would place the information on vehicle network 13 for delivery to communications device 21. The communications device 21 would then display the contact information, such as the contact's name and telephone number and request confirmation that the user desires to place a call. Once confirmed, the mobile communications device 21 would dial the contact to attempt to establish the call. Similarly, contact address information in the host PDA 2 could be directed to the vehicle GPS navigation system 22 for display and/or execution of a routing program to locate and provide routing instructions to the user.

The foregoing disclosure has been set forth merely to illustrate the invention and is not intended to be limiting. Indeed, one of the advantages of the present invention is its inherent flexibility, where the ability to readily update the vehicle operating command selection software allows new vehicle command functionality to be added as desired. Thus, any vehicle component which can be arranged to receive commands via a vehicle communications network would be amenable to control via the present invention's transponder and host device arrangements, and there is no limitation on the updating of the available commands. For example, where the basic functions of a vehicle entertainment system (on/off, volume control, etc.) are controllable from the host device, these functions may later be supplemented by revised command selection software which controls DVD player operation. Further, to avoid excessive host device screen clutter, it may be readily envisioned that the user interface is arranged in a hierarchal structure, where selection of an "entertainment system" icon leads to the presentation of further command options such as volume, channel, station, etc. on another display screen. Accordingly, since modifications of the disclosed embodiments incorporating the spirit and substance of the invention may occur to persons skilled in the art, the invention should be construed broadly to include everything within the scope of the appended claims and equivalents thereof.

What is claimed is:

1. A vehicle control system, comprising:
    a transponder including a wireless signal transmitter;
    a host device including a port for connection to the transponder; and
    a vehicle equipped with a wireless signal receiver,
    wherein
        the host device is programmed to permit selection via a user interface of at least one vehicle component operating command for operating at least one component of the vehicle, wherein said at least one vehicle component operating command is not a command for retrieving diagnostic information from the vehicle,
        the host device sends the selected component operating command to the transponder for transmission from the wireless signal transmitter directly to the vehicle receiver without intermediate transmission, and the receiver sends the selected component operating command received from said transmitter to at least one vehicle component over a vehicle internal communications network.

2. The vehicle control system of claim 1, wherein
the transponder includes a memory circuit,
the memory circuit is programmed with vehicle authorization information associated with a specific vehicle, and
the transponder and the vehicle receiver cooperate to verify the transponder is authorized to control the components of the vehicle.

3. The vehicle control system of claim 2, wherein
the vehicle authorization information is encrypted.

4. The vehicle control system of claim 2, wherein
the host device is programmed with a vehicle component operating command selection program which includes at least one user-selectable vehicle component operating command, and
the vehicle component operating command selection program is executed when the transponder is connected to the host device.

5. The vehicle control system of claim 4, wherein
at least one user-selectable vehicle component operating command is a command for operation of one of a vehicle lock actuator, an engine starter, an entertainment system, and a communication device.

6. The vehicle control system of claim 5, wherein
the verification that the transponder is authorized to control the components of the vehicle is performed prior to transmission of the selected vehicle component command to the desired vehicle component.

7. The vehicle control system of claim 6, wherein
the transponder memory is programmed with the vehicle component operating command selection program, and
when the transponder is connected to the host device, the transponder determines whether the vehicle component operating command selection program is located on the host device, and the command selection program is transferred to the host device if not already present.

8. The vehicle control system of claim 2, wherein
the memory circuit contains user vehicle personal preference information, and the user's personal preference information is transferred to the vehicle.

9. The vehicle control system of claim 2, wherein
the memory circuit contains user vehicle personal preference information, and the user's personal preference information is transferred to the host device when the transponder is connected to the host device.

10. The vehicle control system of claim 9, wherein
the transponder is a first transponder, and the user personal preference information transferred to the host device is uploadable to a second transponder when a second transponder is connected to the host device.

11. The vehicle control system of claim 2, wherein
the host device contains vehicle personal preference information of a plurality of users,
the personal preference information of one of the plurality of users is selectable on the host device, and
the selected user personal preference information is transmitted via the transponder, the vehicle receiver and the vehicle internal network to the vehicle.

12. The vehicle control system of claim 1, wherein
user information contained on the host device is transmitted via the transponder, the vehicle receiver and the vehicle internal network to a target vehicle component.

13. The vehicle control system of claim 12, wherein
the user information transmitted to the vehicle is telephone contact information usable by a vehicle cellular telephone to place a call.

14. The vehicle control system of claim 12, wherein
the user information transmitted to the vehicle is address information usable by a vehicle navigation system for locating an address.

15. The vehicle control system of claim 1, wherein
the host device is a personal digital assistant.

16. The vehicle control system of claim 1, wherein
the host device is a mobile telephone.

17. A method for controlling components of vehicle, comprising the acts of:
connecting a transponder including a wireless signal transmitter to a host device;
executing on the host device a program for selection of at least one vehicle component operating command when the transponder is connected to the host device;
selecting a vehicle component operating command vehicle, wherein said vehicle component operating command is not a command for retrieving diagnostic information from the vehicle;
sending the selected component operating command from the host device to the transponder;
transmitting the selected component operating command from the wireless signal transmitter directly to a wireless signal receiver of a vehicle without intermediate transmission;
sending the selected component operating command from the receiver to at least one vehicle component over an vehicle internal communications network; and
executing the selected component operating command by the at least one vehicle component.

18. The vehicle control method of claim 17, wherein
the transponder includes a memory circuit, and
the memory circuit is programmed with vehicle authorization information associated with a specific vehicle, further comprising the act of:
verifying by cooperation between the transponder and the vehicle receiver that the transponder is authorized to control the components of the vehicle.

19. The vehicle control method of claim 18, wherein
the vehicle authorization information is encrypted.

20. The vehicle control method of claim 18, wherein
at least one user-selectable vehicle component operating command is a command for operation of one of a vehicle lock actuator, an engine starter, an entertainment system, and a communication device.

21. The vehicle control method of claim 20, wherein
the step of verifying that the transponder is authorized to control the components of the vehicle is performed prior to sending the selected vehicle component command to the at least one vehicle component.

22. The vehicle control method of claim 21, wherein
the transponder memory is programmed with the vehicle component operating command selection program, further comprising the acts of:
determining whether the vehicle component operating command selection program is located on the host device when the transponder is connected to the host device, and
transferring the command selection program to the host device if said program is not already present on the host device.

23. The vehicle control method of claim 18, further comprising the act of:
  transferring user vehicle personal preference information contained in the memory circuit to the vehicle.

24. The vehicle control method of claim 18, further comprising the act of:
  transferring user vehicle personal preference information contained in the memory circuit to the host device when the transponder is connected to the host device.

25. The vehicle control system of claim 24, wherein the transponder is a first transponder, and the user personal preference information transferred to the host device is uploadable to a second transponder when a second transponder is connected to the host device.

26. The vehicle control system of claim 18, wherein
  the host device contains vehicle personal preference information of a plurality of users, and
  the personal preference information of one of the plurality of users is selectable on the host device, further comprising the act of:
  transmitting selected user personal preference information via the transponder, the vehicle receiver and the vehicle internal network to the vehicle.

27. The vehicle control method of claim 17, further comprising the act of:
  transmitting user information contained on the host device via the transponder, the vehicle receiver and the vehicle internal network to a target vehicle component.

28. The vehicle control method of claim 27, wherein the user information transmitted to the vehicle is telephone contact information usable by a vehicle cellular telephone to place a call.

29. The vehicle control method of claim 27, wherein the user information transmitted to the vehicle is address information usable by a vehicle navigation system for locating an address.

30. A transponder for control of vehicle components, comprising:
  a transponder including a wireless signal transmitter,
  wherein the transponder is connectable to a host device, and when vehicle component operating commands for operating components of a vehicle are sent to the transponder from a operating command selection program executed on the host device, said vehicle component operating commands not including commands for retrieving diagnostic information from the vehicle, the component operating commands are received by the transponder and transmitted by the wireless signal transmitter in a manner which permits a wireless signal receiver of the vehicle to directly receive and send the transmitted operating commands to at least one vehicle component over an vehicle internal communications network.

31. The vehicle control system of claim 30, wherein
  the transponder includes a memory circuit,
  the memory circuit is programmed with vehicle authorization information associated with a specific vehicle, and
  the transponder cooperates with the vehicle receiver to verify the transponder is authorized to control the components of the vehicle.

32. The vehicle control system of claim 31, wherein
  the transponder memory is programmed with the vehicle component operating command selection program, and
  when the transponder is connected to the host device, the transponder determines whether the vehicle component operating command selection program is located on the host device, and the command selection program is transferred to the host device if not already present.

* * * * *